US012630058B2

(12) United States Patent
Zhao et al.

(10) Patent No.: US 12,630,058 B2
(45) Date of Patent: May 19, 2026

(54) SWIVEL SEAT ASSEMBLY WITH A KICKSTAND MECHANISM

(71) Applicant: MAGNA SEATING INC., Aurora (CA)

(72) Inventors: Kai Zhao, Novi, MI (US); Louis Vetere, II, Commerce Township, MI (US); David M. Runde, Ortonville, MI (US); James Rudberg, Northville, MI (US); Kristof M. Kurzeja, Commerce Township, MI (US)

(73) Assignee: MAGNA SEATING INC., Aurora (CA)

( * ) Notice: Subject to any disclaimer, the term of this patent is extended or adjusted under 35 U.S.C. 154(b) by 101 days.

(21) Appl. No.: 18/693,935

(22) PCT Filed: Oct. 20, 2022

(86) PCT No.: PCT/US2022/047198
§ 371 (c)(1),
(2) Date: Mar. 20, 2024

(87) PCT Pub. No.: WO2023/069565
PCT Pub. Date: Apr. 27, 2023

(65) Prior Publication Data
US 2024/0383379 A1     Nov. 21, 2024

Related U.S. Application Data

(60) Provisional application No. 63/257,813, filed on Oct. 20, 2021.

(51) Int. Cl.
*B60N 2/14*      (2006.01)
(52) U.S. Cl.
CPC ............. *B60N 2/143* (2013.01); *B60N 2/146* (2013.01)

(58) Field of Classification Search
CPC ...... B60N 2/3047; B60N 2/3054; B60N 2/14; B60N 2/143; B60N 2/146
See application file for complete search history.

(56) References Cited

U.S. PATENT DOCUMENTS

| | | | |
|---|---|---|---|
| 3,572,817 A | 3/1971 | Colautti et al. | |
| 4,487,452 A | 12/1984 | Tanizaki et al. | |

(Continued)

FOREIGN PATENT DOCUMENTS

| | | |
|---|---|---|
| CN | 200948754 Y | 9/2007 |
| CN | 202016471 U | 10/2011 |

(Continued)

*Primary Examiner* — Timothy D Collins
*Assistant Examiner* — Terri L Filosi
(74) *Attorney, Agent, or Firm* — Miller Canfield

(57) ABSTRACT

A seat assembly in an automotive vehicle has a base structure, a swivel mechanism fixedly coupled to the base structure, and a seat cushion pivotally coupled to the swivel mechanism. The seat cushion is pivotable between a seating position and a stadium position. The swivel mechanism is configured to selectively rotate the seat cushion between a forward-facing position and a rearward-facing position. The seat assembly includes a plurality of strikers projecting from the base structure and a kickstand mechanism having a kickstand and a latch mechanism. The kickstand is pivotally coupled to the seat cushion and operatively coupled to the latch mechanism. The latch mechanism is configured to releasably latch to an adjacent one of the strikers when the seat cushion is in the seating position. The kickstand mechanism minimizes fore-aft movement of the swivel mechanism when the latch mechanism is latched to the adjacent one of the strikers.

11 Claims, 9 Drawing Sheets

(56)     References Cited

U.S. PATENT DOCUMENTS

| | | |
|---|---|---|
| 4,792,188 A | 12/1988 | Kawashima |
| 5,000,505 A | 3/1991 | Kawashita et al. |
| 5,810,441 A | 9/1998 | Ezuka et al. |
| 6,447,065 B1 | 9/2002 | Ropp |
| 6,575,420 B2 | 6/2003 | Yoshida et al. |
| 7,434,863 B2 | 10/2008 | Hamazaki et al. |
| 7,648,186 B2 | 1/2010 | Ukai et al. |
| 8,556,323 B2 | 10/2013 | Hoge et al. |
| 9,180,792 B2 | 11/2015 | Haller |
| 9,227,529 B2 | 1/2016 | Haller |
| 9,579,995 B2 | 2/2017 | Haller |
| 9,623,769 B1 | 4/2017 | Roeglin et al. |
| 2018/0326884 A1* | 11/2018 | Pailler ................. B60N 2/0742 |

FOREIGN PATENT DOCUMENTS

| | | | |
|---|---|---|---|
| CN | 107351735 A * | 11/2017 | ........... B60N 2/3054 |
| EP | 3398806 A1 | 11/2018 | |

* cited by examiner

1

SWIVEL SEAT ASSEMBLY WITH A KICKSTAND MECHANISM

CROSS-REFERENCE TO RELATED APPLICATIONS

This application claims priority to U.S. Provisional Application 63/257,813, filed on Oct. 20, 2021, the disclosure of which is hereby incorporated by reference in its entirety.

BACKGROUND OF THE INVENTION

1. Field of the Invention

The present invention relates to a seat assembly for use in an automotive vehicle. More particularly, the invention relates to a seat assembly for use in an automotive vehicle and configured to swivel.

2. Description of Related Art

Automotive vehicles typically include one or more seat assemblies having a seat cushion and a seat back for supporting a passenger above a vehicle floor. Certain seat assemblies include a swivel mechanism allowing the seat assembly to be rotated about a vertical axis between a forward-facing seating position and a rearward-facing seating position for improved seating options. One example of a known swivel mechanism for a seat assembly is described in PCT publication WO2020/097281A1, the disclosure of which is hereby incorporated by reference in its entirety. The swivel mechanisms typically have an upper plate rotatably coupled to a lower plate and a plurality of rollers and/or bearings positioned between the upper and lower plates to allow for smooth rotation of the upper plate relative to the lower plate. In certain known seat assemblies, the seat back and seat cushion are supported by a pair of opposing seat brackets fixedly coupled to the upper plate of the swivel mechanism. In order to facilitate rotation of the seat assembly within the automotive vehicle, the seat cushion is typically pivotally coupled to the seat brackets such that the seat cushion can be rotated between a seating position and a stadium (or upright) position. The seat cushion is typically rotated to the stadium position followed by rotating the swivel mechanism to reposition the seat assembly between the forward-facing and rearward-facing seating positions.

It is commonly known for certain swivel mechanisms to include a locking mechanism to selectively lock the upper plate to the lower plate, and bumpers and/or wedges to improve stability of the seat assembly when the swivel mechanism is locked. However, excessive fore-aft chuck in the seat assembly may be perceived by the occupant due to the swivel mechanism. The perceived fore-aft chuck becomes amplified by seat assemblies having a tall seat back.

It is desirable, therefore, to minimize observed fore-aft chuck in a seat assembly having a swivel mechanism and a stadium position when the seat cushion is in the seating position.

SUMMARY OF THE INVENTION

According to one embodiment, there is provided a seat assembly in an automotive vehicle. The seat assembly comprises a base structure, a swivel mechanism fixedly coupled to the base structure, and a seat cushion pivotally coupled to the swivel mechanism. The seat cushion is selectively pivotable between a seating position and a stadium position, wherein the swivel mechanism is configured to selectively rotate the seat cushion between a forward-facing position and a rearward-facing position. The seat assembly also includes a kickstand mechanism and a plurality of strikers projecting from the base structure. The kickstand mechanism comprises a kickstand and a latch mechanism. The kickstand is pivotally coupled to the seat cushion and operatively coupled to the latch mechanism. Further, the latch mechanism is configured to releasably latch to an adjacent one of the plurality of strikers when the seat cushion is in the seating position. The kickstand mechanism minimizes fore-aft chuck of the swivel mechanism when the latch mechanism is latched to the adjacent one of the plurality of strikers.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

FIGS. 1-12 illustrate components of a seat assembly 10 for use in an automotive vehicle 12 according to embodiments described herein. Directional references employed or shown in the description, figures, or claims, such as top, bottom, upper, lower, upward, downward, lengthwise, widthwise, left, right, and the like, are relative terms employed for ease of description and are not intended to limit the scope of the invention in any respect. Referring to the Figures, like numerals indicate like or corresponding parts throughout the several views.

Figure 1:
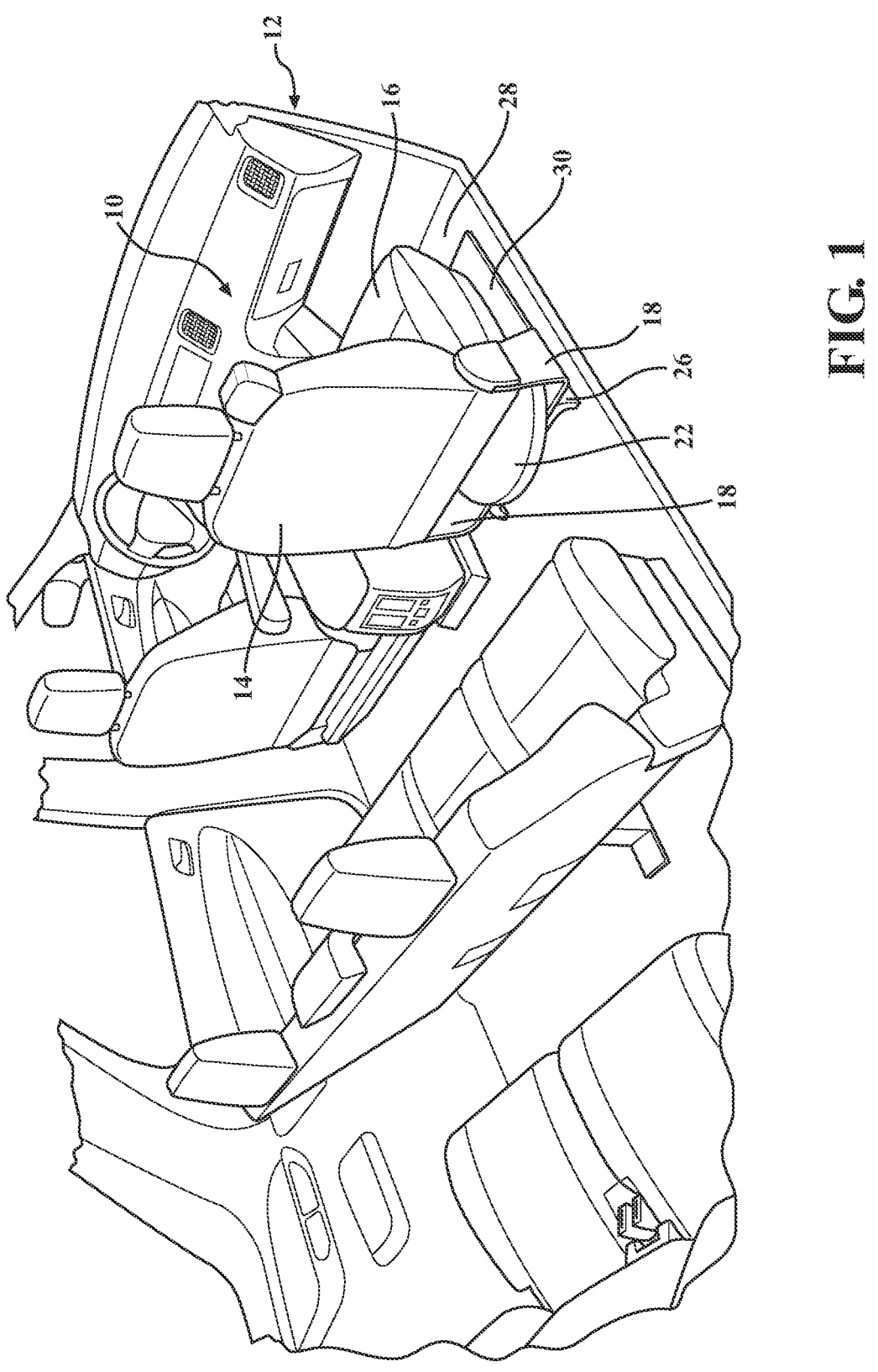
FIG. 1 is a perspective view of a swivel seat assembly in a forward-facing seating position within an automotive vehicle, according to one embodiment of the present invention.
Figure 6:
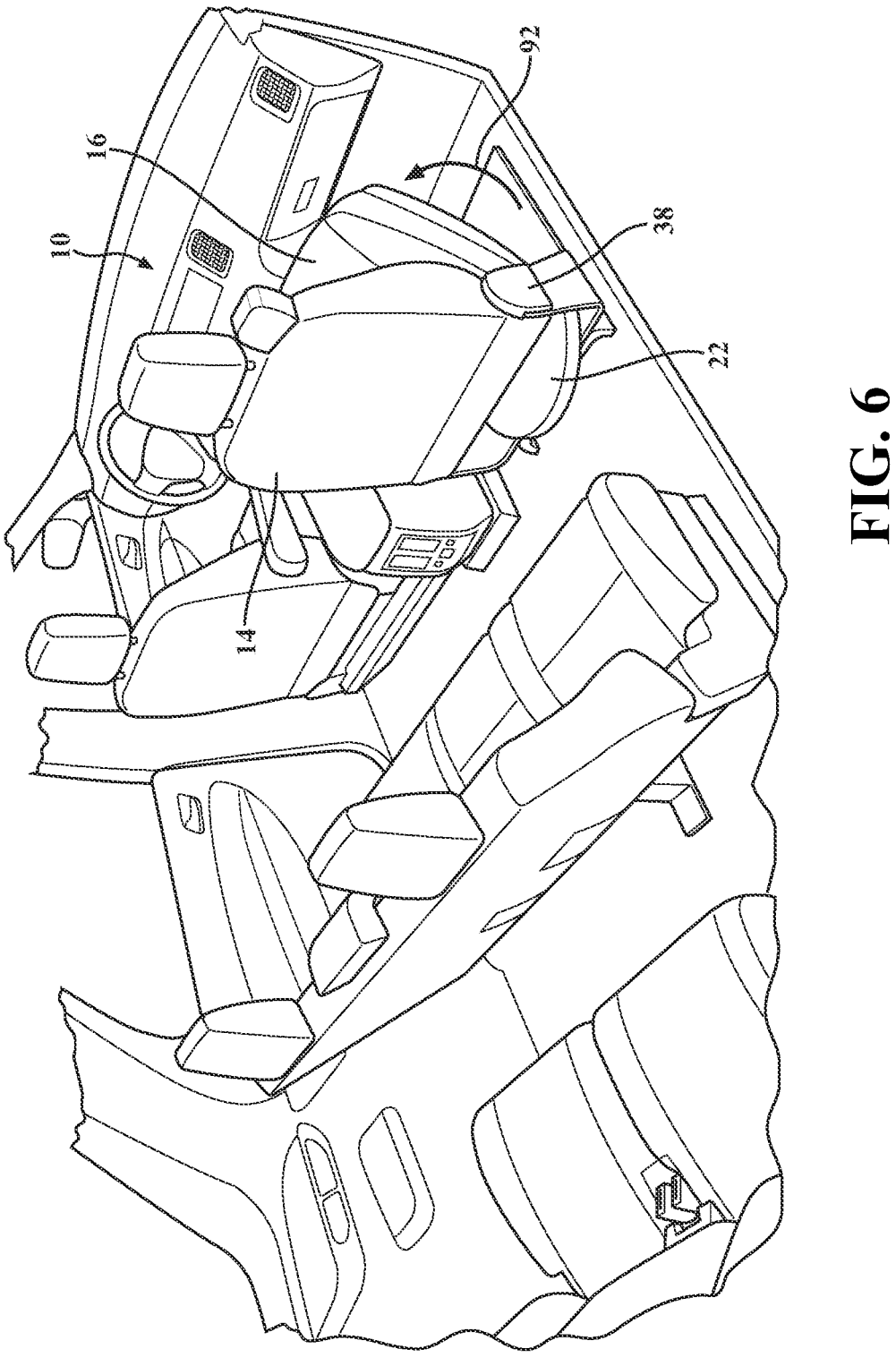
FIG. 6 is a perspective view of the seat assembly of FIG. 1 in a forward-facing stadium position.
Figure 9:
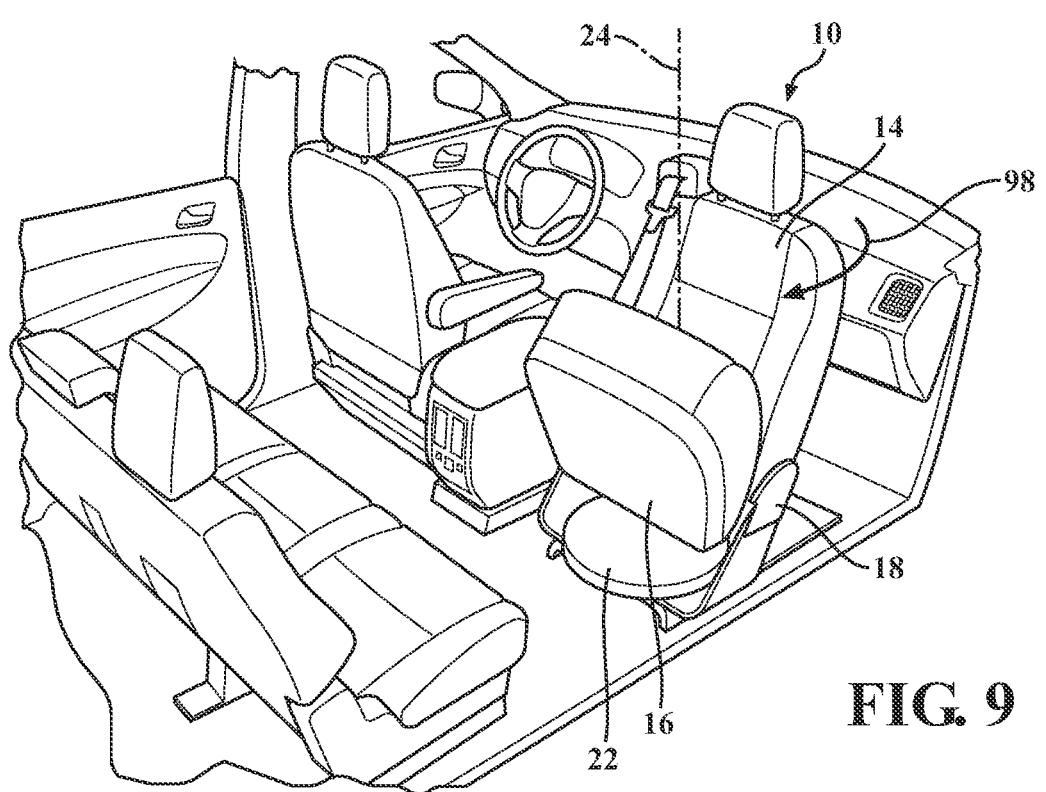
FIG. 9 is a perspective view of the seat assembly of FIG. 8 in the rearward-facing stadium position.

As depicted in FIG. 1, the seat assembly 10 includes a seat back 14 and a seat cushion 16. The seat cushion 16 is pivotally supported between a pair of laterally spaced apart seat brackets 18 and is pivotable between a seating position (FIGS. 1 and 11) and a stadium position (FIGS. 6 and 9). The seat back 14 is also supported between the seat brackets 18 and may pivot between a plurality of reclined seating positions and a fold flat position overlapping the seat cushion 16 as is commonly known in the art.

Figure 2:
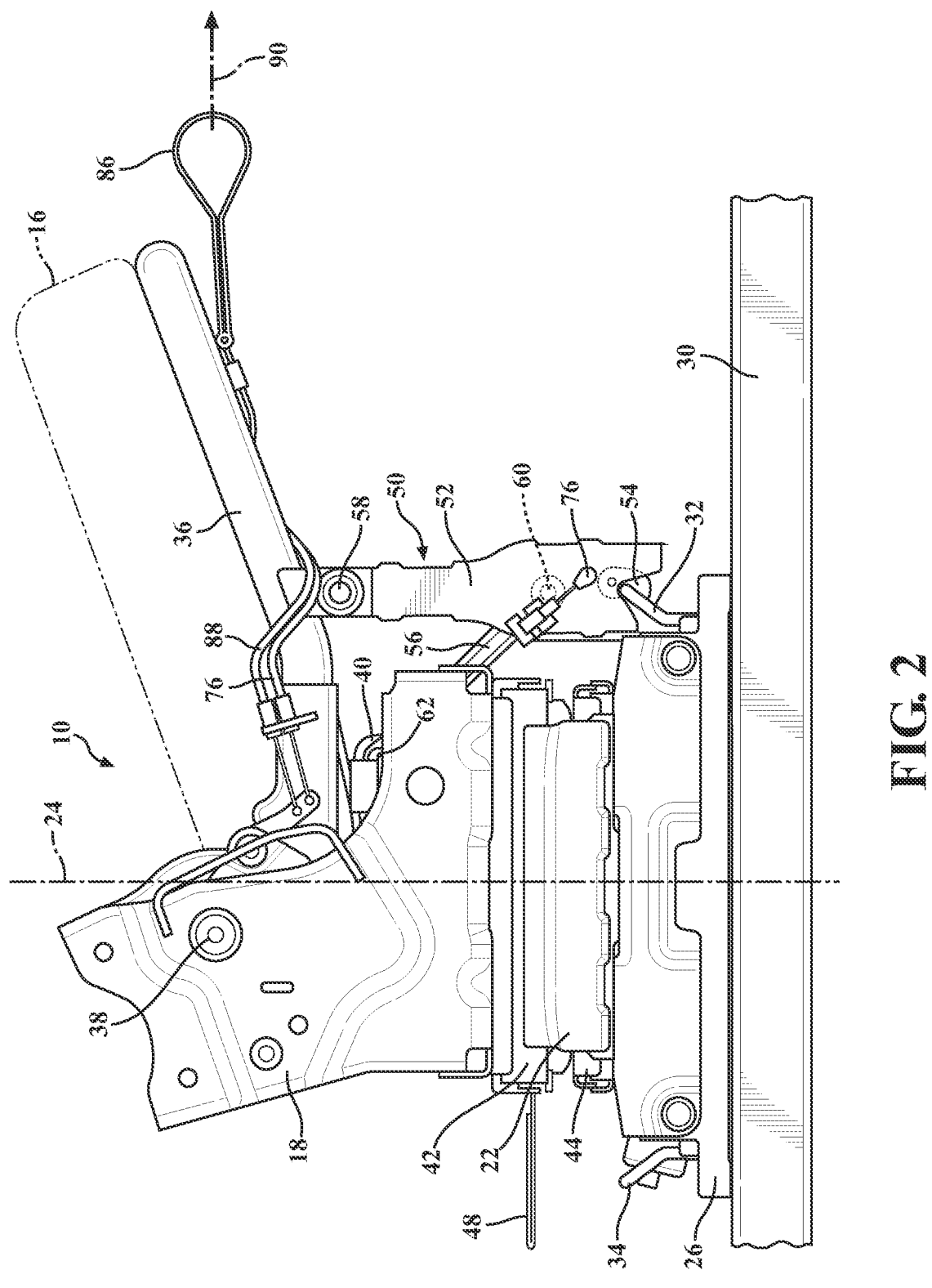
FIG. 2 is a fragmentary side view of a portion of the seat assembly of FIG. 1 showing a kickstand mechanism in a forward latched condition.
Figure 11:
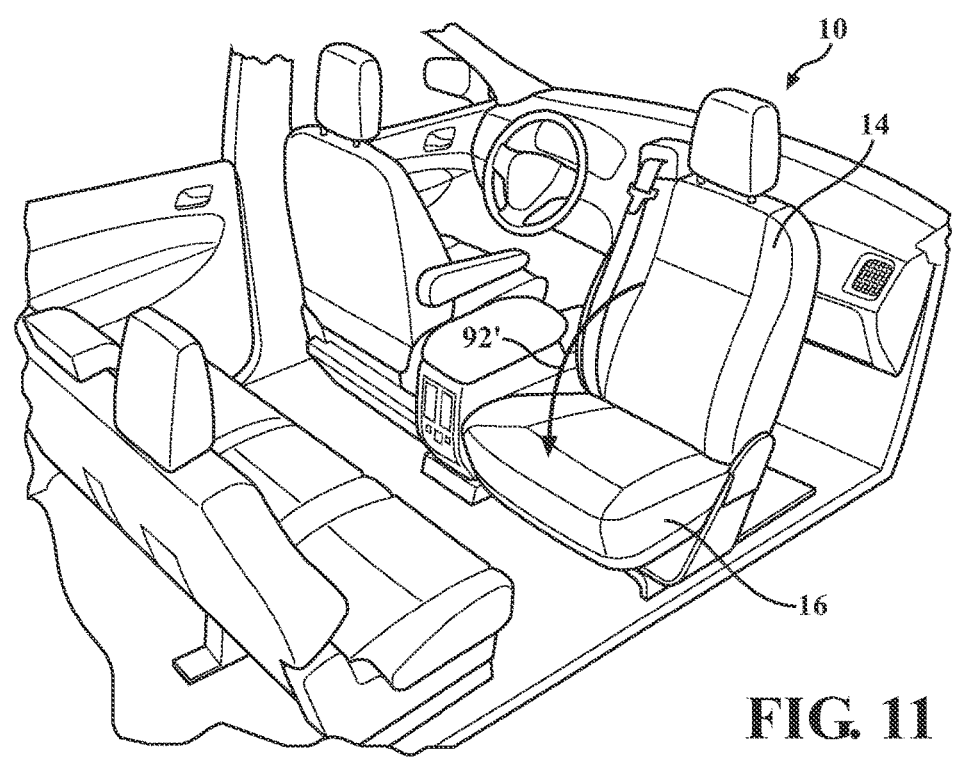
FIG. 11 is a perspective view of the seat assembly of FIG. 9 in a rearward-facing seating position.
Figure 12:
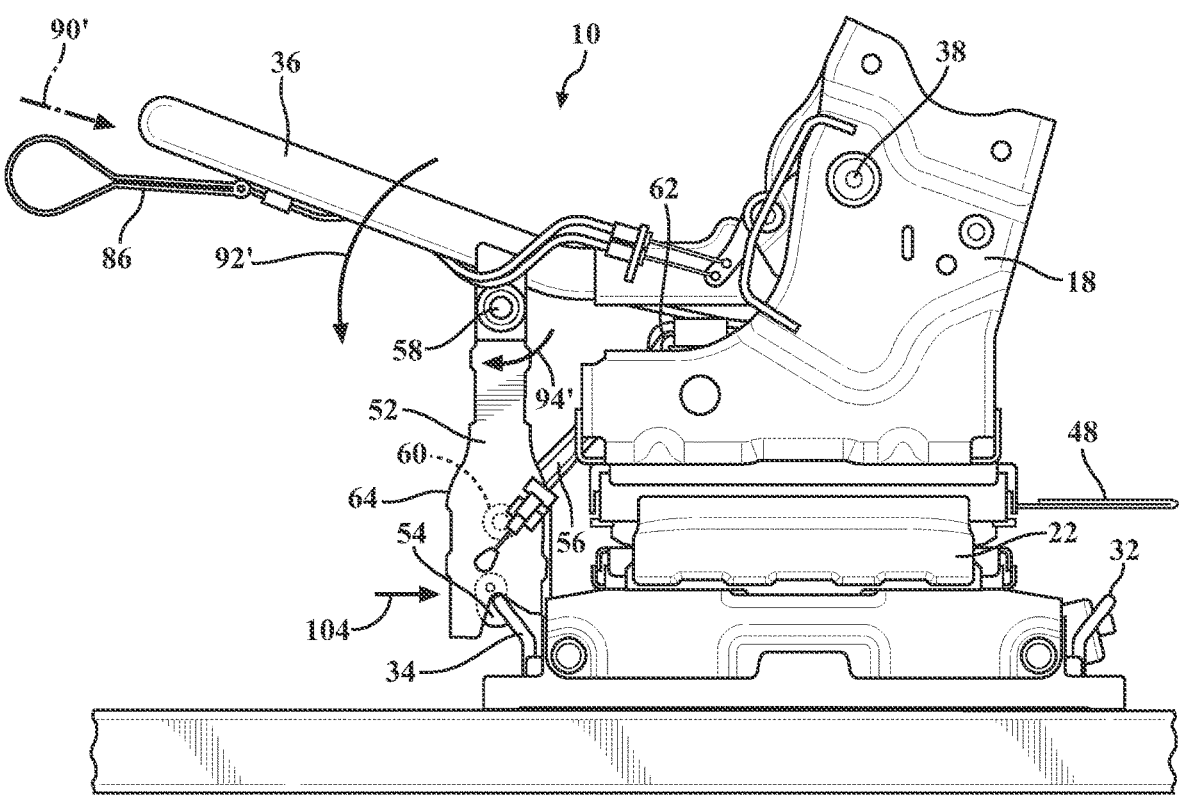
FIG. 12 is a fragmentary side view of a portion of the seat assembly of FIG. 11 showing the kickstand mechanism in the rearward latched condition.

Referring to FIGS. 1 and 2, the seat assembly 10 further includes a swivel mechanism 22 coupled to the seat brackets 18 for providing rotation of the seat assembly 10 within the automotive vehicle 12 around a vertical axis 24. The swivel mechanism 22 provides rotation of the seat assembly 10 between a forward-facing seating position (FIG. 1) and an opposite rearward-facing seating position (FIG. 11). The seat assembly 10 may further include a base structure 26 attached between the swivel mechanism 22 and a floor 28 of the vehicle 12 for mounting and elevating the seat assembly 10 above the vehicle floor 28. The base structure 26 may be coupled to a seat track assembly 30 for providing fore and aft sliding movement of the seat assembly 10 in the vehicle 12, as is commonly known in the art.

Referring to FIGS. 2-5, the seat assembly 10 also includes a plurality of strikers 32, 34, such as opposing forward and rearward strikers 32, 34 projecting from the base structure 26. In addition, the seat cushion 16 includes a cushion frame 36 pivotally coupled to the seat brackets 18 through respective inboard and outboard cushion pivots 38. The cushion pivots 38 are configured to allow rotation of the cushion frame 36 about the cushion pivots 38. Further, the cushion pivots 38 may be configured to selectively lock the cushion frame 36 in the seating position (FIGS. 1 and 11) and/or in the stadium position (FIGS. 6 and 9). In the embodiment shown in FIG. 3, a support bracket 40 is fixedly coupled to one of the seat brackets 18.

Figures 3, 4:
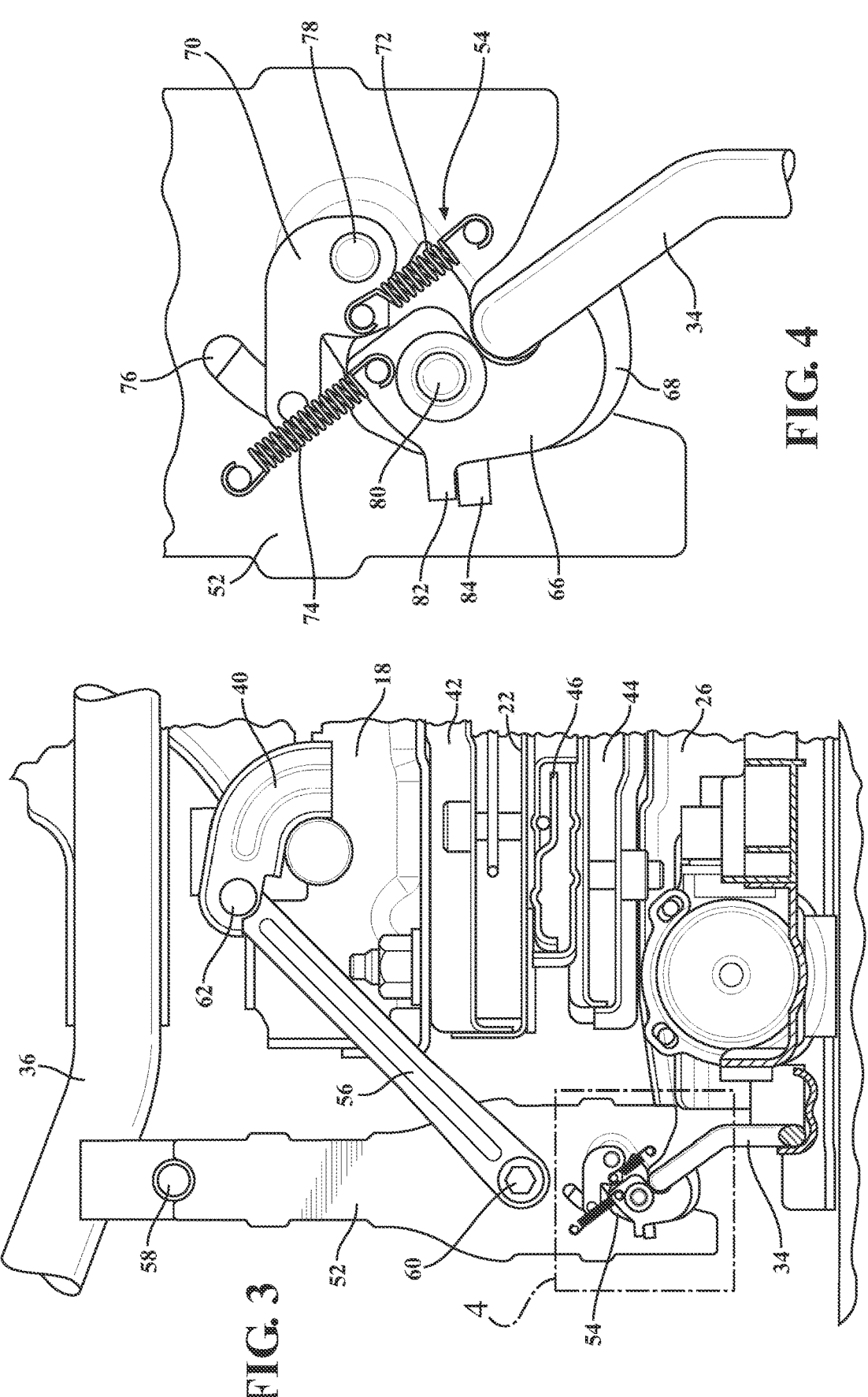
FIG. 3 is an enlarged fragmentary side view of a portion of the seat assembly of FIG. 2 in a rearward-facing seating position and the kickstand mechanism in a rearward latched condition.
FIG. 4 is an enlarged fragmentary side view of a portion of the seat assembly of FIG. 3 showing details of a double-hook latch.

Referring to FIGS. 2 and 3, one embodiment of the swivel mechanism 22 includes an upper plate assembly 42 rotationally coupled to a lower plate assembly 44 and configured to facilitate axial rotation of the upper plate assembly 42 relative to the lower plate assembly 44. In this embodiment, the upper and lower plate assemblies 42, 44 are fixedly coupled to the seat brackets 18 and the base structure 26, respectively. The swivel mechanism 22 also includes a locking mechanism 46 configured to selectively couple the upper and lower plate assemblies 42, 44 to each other to prevent axial rotation of the upper plate assembly 42 relative to the lower plate assembly 44. An unlock strap 48 is operatively coupled to the locking mechanism 46 and configured to selectively unlock the locking mechanism 46 when tension is applied to the unlock strap 48.

Depicted in FIGS. 2-5, the seat assembly 10 further includes a kickstand mechanism 50 comprising a kickstand 52, a double-hook latch 54, and a latch link 56. An upper end of the kickstand 52 is pivotally coupled to the cushion frame 36 by a kickstand pivot 58. The double-hook latch 54 is a latch mechanism operatively coupled to a lower end of the kickstand 52. A distal end of the latch link 56 is pivotally coupled to the kickstand 52 by a link pivot 60. In addition, a proximal end of the latch link 56 is pivotally coupled to the support bracket 40 by a bracket pivot 62. It should be appreciated that in an alternate embodiment, the proximal end of the latch link 56 may be pivotally coupled directly to

Figure 5:
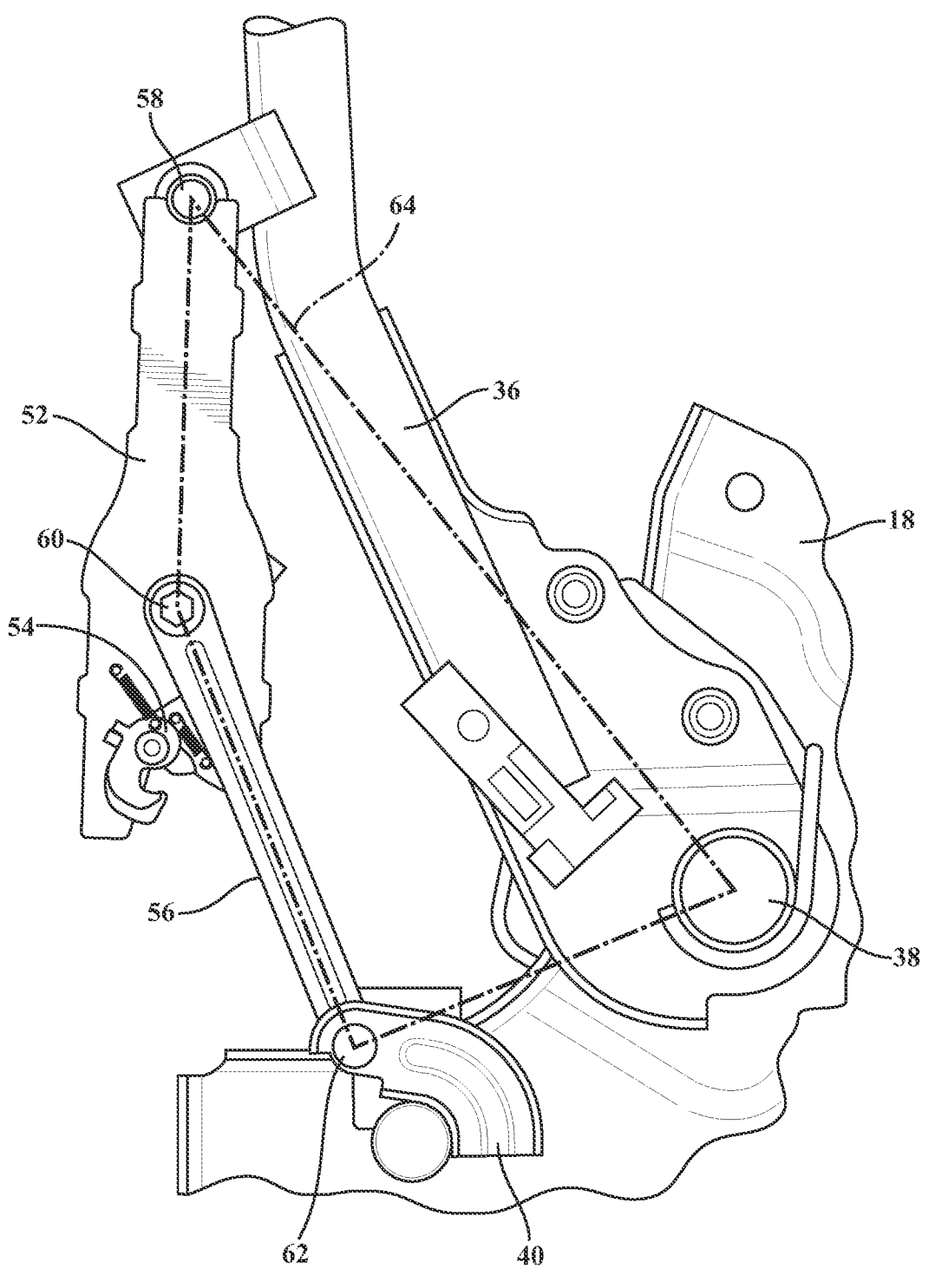
FIG. 5 is an enlarged fragmentary side view of a portion of the seat assembly of FIG. 3 in a rearward-facing stadium position with the kickstand mechanism in an unlatched condition.

4 one of the seat brackets 18. As illustrated in FIG. 5, the latch link 56, the seat bracket 18, the cushion frame 36, and the kickstand 52 form a four-bar linkage 64. More specifically, the connections between the cushion frame 36, the kickstand 52, the latch link 56, the seat bracket 18, the cushion pivot 38, the kickstand pivot 58, the link pivot 60, and the bracket pivot 62 define the four-bar linkage 64. The seat assembly 10 may include a single kickstand mechanism 50 operatively coupled to the inboard side, the outboard side, or centrally located within the seat assembly 10. Alternatively, the seat assembly 10 may include two kickstand mechanisms 50 operatively coupled to opposing sides of the cushion frame 36 without varying the scope of the present invention.

As illustrated in FIG. 4, the double-hook latch 54 includes an anti-rattle latch 66, a structural latch 68, a locking cam 70, a cam spring 72, and a latch spring 74. A distal end of a latch release cable 76 is fixedly coupled to the locking cam 70. The locking cam 70 is pivotally coupled to the kickstand 52 by a cam pivot 78 and spring-biased towards an engaged condition with the structural latch 68 by the cam spring 72. The structural latch 68 and the anti-rattle latch 66 are also pivotally coupled to the kickstand 52 by a latch pivot 80 with the anti-rattle latch 66 spring-biased towards a latched condition with the striker 32, 34. Upper and lower tabs 82, 84 project from the anti-rattle and structural latches 66, 68, respectively. The double-hook latch 54 is configured to automatically latch onto a striker 32, 34 when the striker 32, 34 engages with the double-hook latch. It will be appreciated that in alternate embodiments, the double-hook latch 54 may be replaced by other latch mechanisms without altering the scope of the present invention.

Depicted in FIG. 2, a proximal end of the latch release cable 76 is operatively coupled to a release mechanism 86 (e.g., an unlock loop) extending from the cushion frame 36. In the embodiment shown in FIG. 2, the seat assembly 10 also includes a cushion release cable 88 having a distal end operatively coupled to the release mechanism 86 and a proximal end operatively coupled to the cushion pivots 38.

FIGS. 1, 2, and 6-12 illustrate a process to swivel the seat assembly 10 between the forward-facing seating position (FIGS. 1 and 2) and a rearward-facing seating position (FIGS. 11 and 12) according to one embodiment of the present invention. When the seat assembly 10 is in the forward-facing seating position shown in FIG. 2, the occupant initiates the swivel process by pulling the release mechanism 86 (arrow 90), causing tension to be applied to the latch release cable 76 and to the cushion release cable 88. The tension applied to the cushion release cable 88 unlocks the cushion pivots 38, and the tension applied to the latch release cable 76 unlatches the double-hook latch 54 from the forward striker 32.

Figure 7:
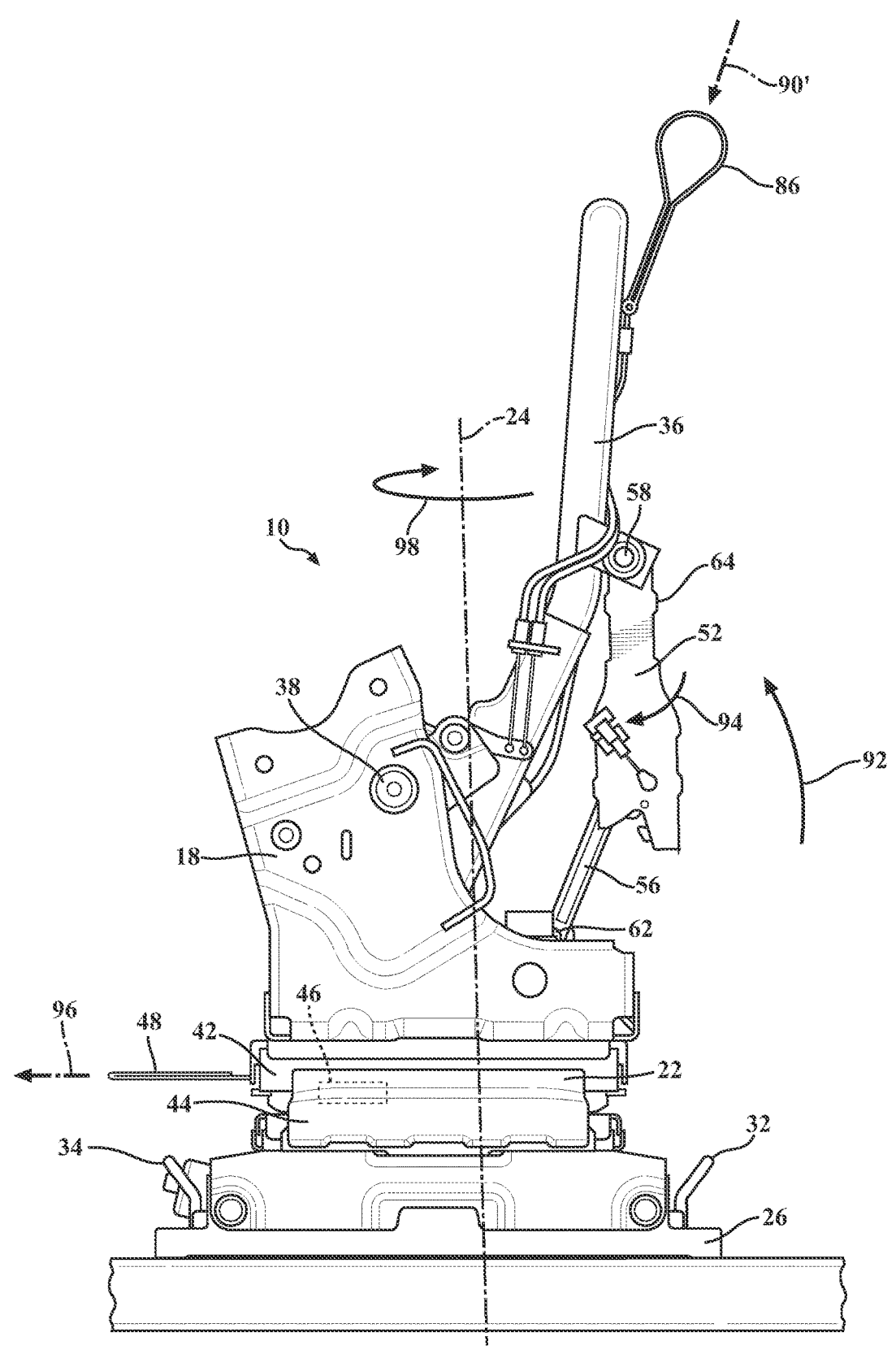
FIG. 7 is a fragmentary side view of a portion of the seat assembly of FIG. 6 in the forward-facing stadium position with the kickstand mechanism in the unlatched condition.
Figure 8:
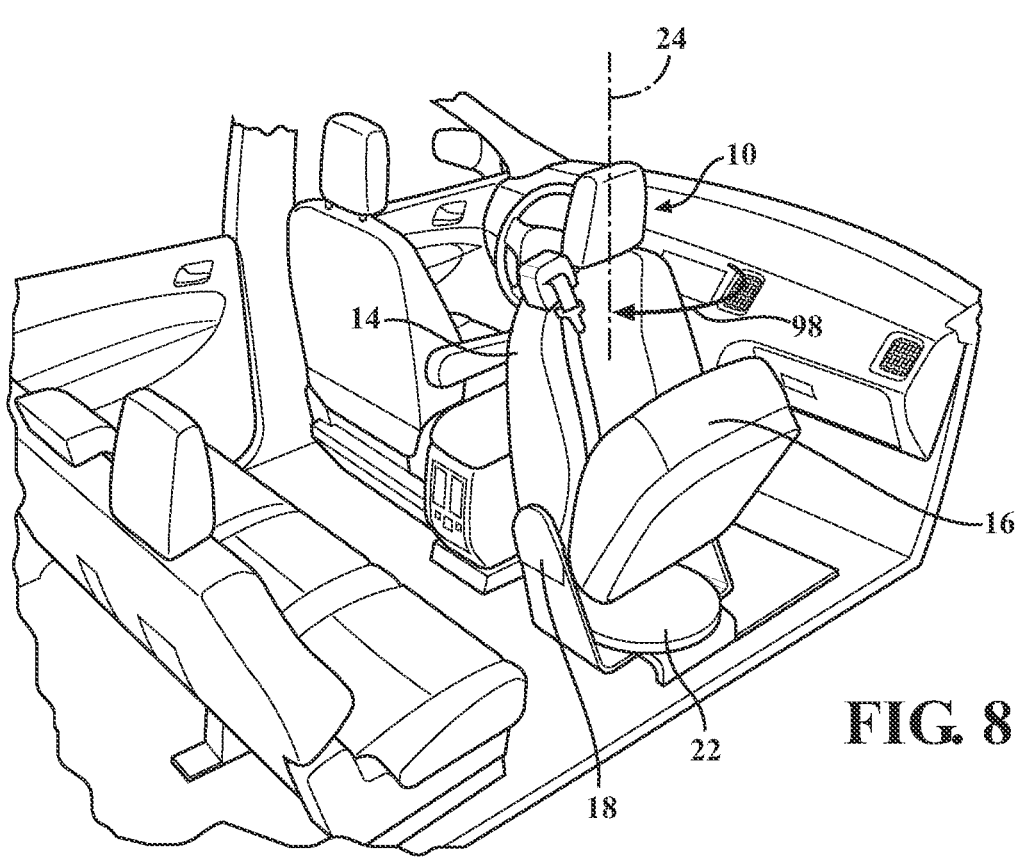
FIG. 8 is a perspective view of the seat assembly of FIG. 6 showing the seat assembly in a mid-rotation position.

While the cushion pivots 38 and the double-hook latch 54 are unlocked, the occupant rotates the cushion frame 36 upward (arrow 92) from the seating position in FIGS. 1 and 2 to the forward-facing stadium position in FIGS. 6 and 7. The occupant may release the release mechanism 86 (arrow 90') after the cushion frame 36 is rotated upward away from the seating position. The cushion pivots 38 will remain unlocked until the cushion frame 36 is in one of a plurality of predetermined locking positions, such as in the seating position or the stadium position. The double-hook latch 54 retains the structural latch 68 and the anti-rattle latch 66 in the unlatched condition while the double-hook latch 54 is spaced apart from the strikers 32, 34. As the occupant rotates the cushion frame 36 upward (arrow 92) from the seating position towards the stadium position, the four-bar linkage 64 causes the kickstand 52 to retract towards the seat bracket 18 (arrow 94). The cushion pivots 38 automatically relock after the cushion frame 36 is placed in the stadium position.

Figure 10:
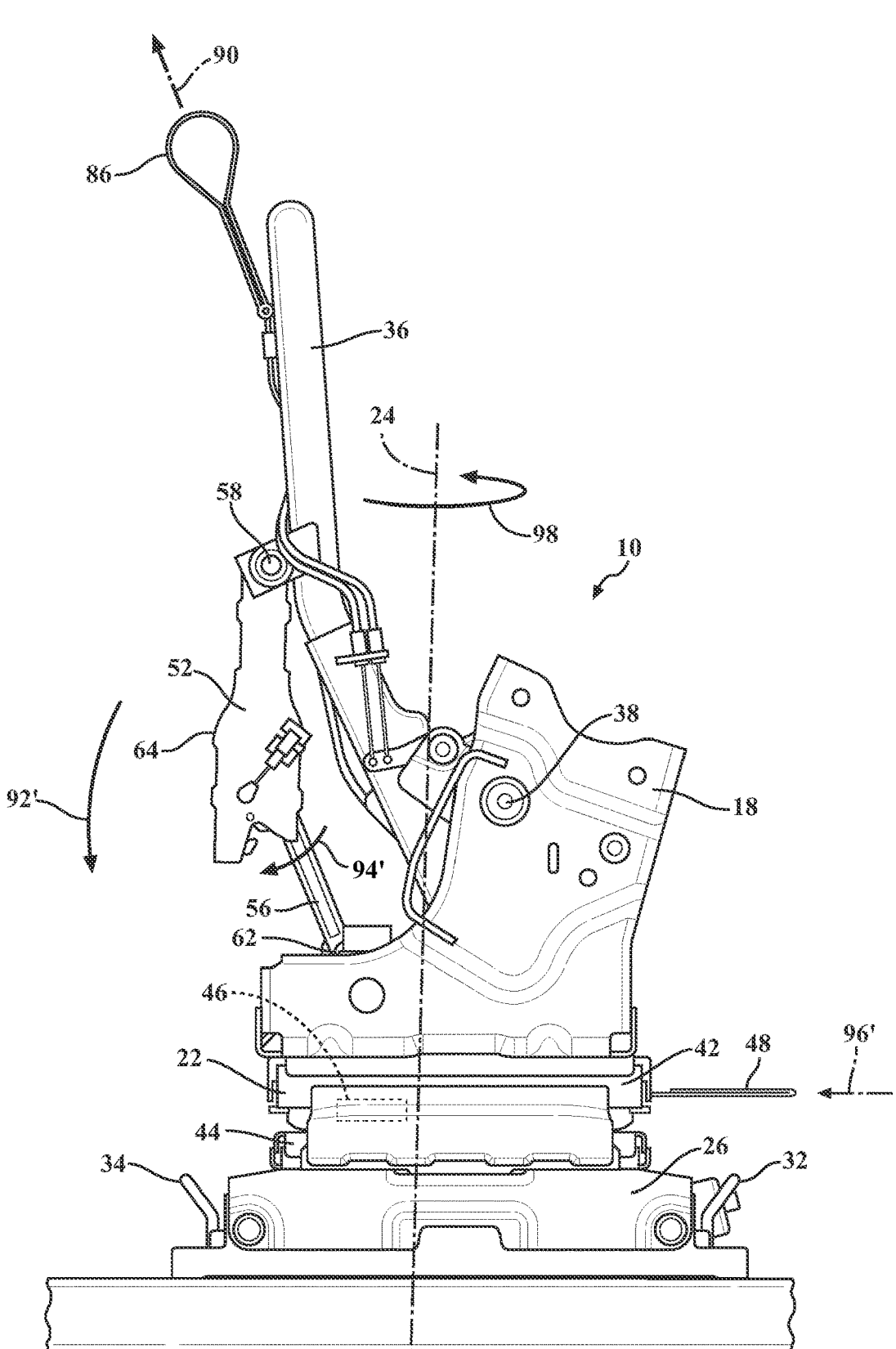
FIG. 10 is a fragmentary side view of a portion of the seat assembly of FIG. 9 in the rearward-facing stadium position and the kickstand mechanism in the unlatched condition.

Next, the occupant pulls the unlock strap 48 (arrow 96 in FIG. 7), causing the locking mechanism 46 to unlock the upper plate assembly 42 from the lower plate assembly 44 of the swivel mechanism 22. Referring to FIGS. 7-10, while the swivel mechanism 22 is unlocked, the occupant rotates an upper portion of the seat assembly 10 about the vertical axis 24 from the forward-facing stadium position (FIGS. 6 and 7) towards a mid-rotation position (FIG. 8) and towards the rearward-facing stadium position (FIGS. 9 and 10), as illustrated by arrow 98. As shown in FIG. 10, the occupant may release the unlock strap 48 (arrow 96') after the seat assembly 10 is rotated away from the forward-facing stadium position. The swivel mechanism 22 will remain unlocked until the upper plate assembly 42 is aligned with one of a plurality of predetermined locking locations, such as the rearward-facing and forward-facing stadium positions.

In the embodiment shown in FIG. 10, the locking mechanism 46 automatically relocks the upper plate assembly 42 to the lower plate assembly 44 when the upper plate assembly 42 is aligned with the rearward-facing stadium position. Depicted in FIGS. 10-12, when the seat assembly 10 is in the rearward-facing stadium position, the occupant pulls the release mechanism 86 (arrow 90), applying tension to the cushion release cable 88, and causing the cushion pivots 38 to unlock. While the cushion pivots 38 are unlocked, the occupant rotates the cushion frame 36 downward (arrow 92') around the cushion pivots 38 towards the rearward-facing seating position shown in FIGS. 11 and 12. The occupant may release the release mechanism 86 (arrow 90') after the cushion frame 36 is rotated downward away from the stadium position. Illustrated in FIGS. 10 and 12, the four-bar linkage 64 causes the kickstand 52 to deploy away from the seat brackets 18 (arrow 94') and guides the double-hook latch 54 towards the rearward striker 34 until it engages with the rearward striker 34 and causes the anti-rattle and structural latches 66, 68 to latch onto the rearward striker 34, as illustrated by arrow 104 in FIG. 12. In addition, the cushion pivots 38 automatically relock when the cushion frame 36 arrives in the rearward-facing seating position. At this point, the seat assembly 10 is in the rearward-facing seating position and may be used by the occupant. The process is reversed to swivel the seat assembly 10 between the rearward-facing seating position (FIGS. 11 and 12) and the forward-facing seating position (FIGS. 1 and 2).

The kickstand mechanism 50 minimizes and stabilizes fore-aft movement (e.g., fore-aft chuck) within the seat assembly 10 when the seat assembly 10 is in the forward-facing or rearward-facing seating positions and the double-hook latch is latched onto one of the forward and rearward strikers 32, 34.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A seat assembly in an automotive vehicle, the seat assembly comprising:
   a base structure;
   a swivel mechanism fixedly coupled to the base structure;

a seat cushion pivotally coupled to the swivel mechanism, wherein the seat cushion is selectively pivotable between a seating position and a stadium position, wherein the swivel mechanism is configured to selectively rotate the seat cushion between a forward-facing position and a rearward-facing position;
   a plurality of strikers projecting from the base structure;
   a kickstand mechanism comprising a kickstand and a latch mechanism, wherein the kickstand is pivotally coupled to the seat cushion and operatively coupled to the latch mechanism, and wherein the latch mechanism is configured to releasably latch to an adjacent one of the plurality of strikers when the seat cushion is in the seating position; and
   a seat bracket fixedly coupled to the swivel mechanism, wherein the seat bracket pivotally couples the seat cushion to the swivel mechanism;
   wherein the kickstand mechanism minimizes fore-aft movement of the swivel mechanism when the latch mechanism is latched to the adjacent one of the plurality of strikers;
   wherein the kickstand mechanism further comprises a latch link having a distal end pivotally coupled to the kickstand and a proximal end pivotally coupled to the seat bracket; and
   wherein the latch link, the seat bracket, the seat cushion, and the kickstand form a four-bar linkage configured to automatically retract the kickstand towards the seat bracket as the seat cushion is pivoted from the seating position towards the stadium position.

2. The seat assembly as set forth in claim 1, wherein the four-bar linkage automatically deploys the kickstand away from the seat bracket as the seat cushion is pivoted from the stadium position towards the seating position.

3. The seat assembly as set forth in claim 2, wherein:
   as the seat cushion is pivoted from the stadium position towards the seating position, the latch link guides the latch mechanism towards the adjacent one of the plurality of strikers.

4. The seat assembly as set forth in claim 3, wherein:
   the latch mechanism automatically latches to the adjacent one of the plurality of strikers as the latch mechanism engages with the adjacent one of the plurality of strikers.

5. The seat assembly as set forth in claim 4, wherein the latch mechanism comprises a double-hook latch.

6. The seat assembly as set forth in claim 4, wherein the base structure is coupled to a seat track assembly configured to provide fore and aft sliding movement and reposition the seat assembly within the vehicle.

7. The seat assembly as set forth in claim 6, wherein:
   the seat cushion includes inboard and outboard sides; and
   the kickstand is pivotally coupled to one of the inboard and outboard sides of the seat cushion.

8. The seat assembly as set forth in claim 7, wherein:
   the seat assembly further comprises a second kickstand mechanism pivotally coupled to another one of the inboard and outboard sides of the seat cushion.

9. The seat assembly as set forth in claim 1, further comprising a release mechanism configured to unlatch the latch mechanism from the adjacent one of the plurality of strikers when the seat cushion is in the seating position.

10. The seat assembly as set forth in claim 1, wherein the seat cushion is rotatable between the forward-facing position and the rearward-facing position while the seat cushion is in the stadium position and the latch mechanism is unlatched from the adjacent one of the plurality of strikers.

11. The seat assembly as set forth in claim 1, wherein the kickstand stabilizes the swivel mechanism when the seat cushion is in the seating position and the latch mechanism is latched to the adjacent one of the plurality of strikers.

* * * * *